United States Patent
Shanidze et al.

(10) Patent No.: US 12,474,771 B2
(45) Date of Patent: Nov. 18, 2025

(54) OCULOMOTOR SIMULATOR FOR ASSESSING EYE-TRACKING ACCURACY

(71) Applicants: Natela M. Shanidze, San Francisco, CA (US); Anca Velisar, Belmont, CA (US); Albert William Lotze, Aptos, CA (US); Kassia K. Love, Boston, MA (US)

(72) Inventors: Natela M. Shanidze, San Francisco, CA (US); Anca Velisar, Belmont, CA (US); Albert William Lotze, Aptos, CA (US); Kassia K. Love, Boston, MA (US)

( * ) Notice: Subject to any disclaimer, the term of this patent is extended or adjusted under 35 U.S.C. 154(b) by 359 days.

(21) Appl. No.: 18/362,467

(22) Filed: Jul. 31, 2023

(65) Prior Publication Data

US 2025/0044863 A1 Feb. 6, 2025

(51) Int. Cl.
*G06F 3/01* (2006.01)
*H04N 23/90* (2023.01)

(52) U.S. Cl.
CPC .............. *G06F 3/013* (2013.01); *H04N 23/90* (2023.01)

(58) Field of Classification Search
CPC .................................. G06F 3/013; H04N 23/90
See application file for complete search history.

(56) References Cited

U.S. PATENT DOCUMENTS

| | | | |
|---|---|---|---|
| 9,358,475 B2 * | 6/2016 | Michalowski | A63H 15/06 |
| 9,776,097 B2 * | 10/2017 | Smoot | A61F 2/141 |
| 9,782,252 B2 * | 10/2017 | Christopherson | A61F 2/141 |
| 9,805,516 B2 * | 10/2017 | Liu | H04N 13/366 |
| 10,394,318 B2 * | 8/2019 | Kruglick | G06T 7/74 |
| 11,010,951 B1 * | 5/2021 | Schwartz | G06F 3/012 |
| 11,112,863 B2 * | 9/2021 | Miller | G06F 3/167 |
| 11,694,419 B2 * | 7/2023 | Haro | G06T 19/20 |
| | | | 345/619 |
| 12,067,161 B1 * | 8/2024 | Arbabi | G01S 7/521 |
| 12,346,494 B2 * | 7/2025 | Peng | G06V 10/25 |
| 2015/0186722 A1 * | 7/2015 | Cho | H04N 23/74 |
| | | | 348/78 |
| 2016/0363763 A1 * | 12/2016 | Yang | G02B 27/0101 |
| 2018/0335839 A1 * | 11/2018 | Lin | G06F 3/013 |
| 2020/0085297 A1 * | 3/2020 | Woods | G09B 23/28 |

(Continued)

*Primary Examiner* — Vinh T Lam
(74) *Attorney, Agent, or Firm* — Poornima Balsubramanyam

(57) ABSTRACT

A system is described for determining accuracy of an eye-tracking device using an oculomotor simulator assembly. The system receives instructions specifying movement for simulated eyeballs in the oculomotor simulator assembly. The system enables movement of the simulated eyeballs based on the received instructions. The system obtains ground-truth values for three-dimensional gaze directions of the simulated eyeballs in response to the enabled movement using projections of laser diodes from the center of the simulated eyeballs during the specified movement. The system additionally gathers three-dimensional gaze directions as determined by the eye-tracking device that is tracking the simulated eyeballs during the specified movement. The system determines accuracy of the eye-tracking device based on the obtained ground-truth values and the determined three-dimensional gaze directions from the eye-tracking device.

20 Claims, 7 Drawing Sheets

(56) References Cited

U.S. PATENT DOCUMENTS

| | | | |
|---|---|---|---|
| 2020/0391383 A1* | 12/2020 | Burgess | B25J 9/1664 |
| 2023/0274485 A1* | 8/2023 | Makiguchi | G06T 19/003 |
| | | | 382/103 |
| 2023/0324987 A1* | 10/2023 | Lin | G06F 3/013 |
| | | | 345/156 |

* cited by examiner

500

Receive instruction specifying movement for each simulated eyeball from a set of one or more simulated eyeballs.
510

↓

Enable movement of the simulated eyeball based on the received instructions.
520

↓

Obtain ground truth value for 3D gaze direction of the simulated eyeball during the specified movement.
530

↓

Determine accuracy of an eye-tracking device based on received values for 3D gaze direction of the simulated eyeballs from the eye-tracking device performing eye-tracking of the simulated eyeballs and the obtained ground truth values for the simulated eyeballs.
540

FIG. 5

OCULOMOTOR SIMULATOR FOR ASSESSING EYE-TRACKING ACCURACY

FIELD OF THE INVENTION

This disclosure relates generally to an oculomotor simulator with simulated eyeballs, and specifically relates to determining the accuracy of three-dimensional gaze detection in eye-tracking devices using the oculomotor simulator.

BACKGROUND

Eye-tracking is essential for understanding certain visual and oculomotor disorders. Some disorders add complexities to eye-tracking approaches. Such disorders include large misalignment between the visual (fixational locus to object) and pupillary axes, decreased fixational accuracy and increased fixational instability, and potential misalignment of the eyes. The advent of eye-tracking devices allows for a more complete understanding of eye and gaze movement deficits that occur in oculomotor disorders.

Eye-tracking devices may use computer vision-based algorithms for eye-tracking, including estimating three-dimensional (3D) gaze direction by optimizing parameters of an eye model. Such algorithms may have certain built-in assumptions, such as the alignment of the visual and pupillary axes and eye convergence on the target during calibration. However, such assumptions may be violated in individuals with oculomotor and visual disorders, leading to greater calibration and eye-tracking errors when using these devices. For example, misalignment of the visual axis and reduction in fixational stability due to eccentric fixation, difficulty in finding or resolving a calibration target, non-linear eye placement on calibration targets (e.g., due to multiple fixational loci used throughout calibration), or deficits in saccadic latency and accuracy may each play a role in reducing calibration accuracy of an eye-tracking device. What is needed is a system and method to evaluate these factors independently as well as in combination, and establish ground truth values for eye-movements such that it is possible to assess whether measured changes in eye-tracking accuracy and effectiveness are the result of some oculomotor changes associated with disorders, or due to poor tracking by the devices themselves.

SUMMARY

An oculomotor simulator system is described herein that provides ground truth assessment of eye-tracking fidelity of an eye-tracking device. The oculomotor simulator consists of one or more independently controlled simulated eyeballs that may have rotational and translational motion, and that may be calibrated for eye-tracking using standard eye-tracking calibration routines. The simulated eyeballs may be positioned both statically or dynamically for a range of conjugate and dis-conjugate behaviors, including saccades and smooth pursuit in the 3-dimensional (3D) space, as well as for emulating behaviors associated with visual/oculomotor deficits (e.g., eccentric fixation, fixational instability, dis-conjugate eye movements/fixation, etc.). The simulator may be used for validation purposes with camera-based eye-tracking, and in settings where eye-tracking is performed.

In embodiments described herein, for each simulated eyeball from a set of one or more simulated eyeballs of an oculomotor simulator, the system receives instructions that specify movement for a simulated eyeball. The system enables movement of the simulated eyeball based on the received instructions. The system obtains a ground-truth value for 3D gaze of the simulated eyeball during the specified movement. The system determines accuracy of an eye-tracking device that is performing eye-tracking of the simulated eyeball when performing the specified movement. The determination of the accuracy is based on the obtained ground-truth value from the oculomotor simulator and the received values for the 3D gaze of the simulated eyeball from the eye-tracking device during the specified movement.

In some embodiments, specifying the movement for the simulated eyeball involves at least one of: specifying rotation parameters for the simulated eyeball and specifying translational motion parameters for the simulated eyeball.

In some embodiments, the system obtains the ground-truth values from the oculomotor simulator for the 3D gaze of the simulated eyeball during the specified movement. The system receives projection data from a laser diode that is located at the center of the simulated eyeball, the projection data based on 3D projection during the specified movement. The system determines 3D gaze direction for the simulated eyeball based on the received projection data. The system establishes the determined 3D gaze direction for the simulated eyeball as the ground-truth value for the 3D gaze for the simulated eyeball during the specified movement.

In some embodiments, prior to receiving the projection from the laser diode that is located at the center of the simulated eyeball, the system causes the laser diode to project through an aperture at the center of a simulated pupil that is located on the simulated eyeball during the specified movement of the simulated eyeball.

In some embodiments, the accuracy of the eye-tracking device that is performing eye-tracking of the simulated eyeballs during the specified movements is determined by the system as follows: For each of the simulated eyeballs, the system receives the 3D gaze direction for the simulated eyeball during the specified movement from the eye-tracking device, compares the obtained ground-truth value for the specified movement with the determined 3D gaze direction for the simulated eyeball from the eye-tracking device for the specified movement, and determines, based on the comparing, the accuracy of the eye-tracking device when tracking the simulated eyeball during the specified movement. The system then combines the determined accuracies of the eye-tracking device with respect to the simulated eyeballs to establish the accuracy of the eye-tracking device.

In some embodiments, prior to receiving instructions at the simulator, the system provides named visual conditions to a machine learning (ML) model, the named visual condition being either normal vision or a named disorder. In response to this, the system receives, a time-series of one or more of: head movements or eye movements corresponding to the named condition from the machine learning model, and generates instructions specifying movement for the one or more simulated eyeballs based on the received time-series of one or more of: head movements or eye movements corresponding to the named condition.

In some embodiments, the ML model is previously generated as follows: (i) the system receives training data that comprises a plurality of time-series of one or more of: head movements or eye movements, (ii) the system receives training data that associates each of the plurality of time-series of one or more of: head movements or eye movements to one or more named conditions, the named conditions being one or more of: normal vision or a named disorder, (iii) the system stores the received training data regarding the plurality of time-series of one or more of: head movements or eye movements and the associated condition, and (iv) the system trains the ML model based on the stored training data, the training involving generating as output, a time-series of one or more of: head movements or eye movements in response to a named condition as input.

A device assembly is described herein that provides ground truth assessment of eye-tracking fidelity of an eye-tracking device. The device assembly comprises an oculomotor simulator assembly. The oculomotor simulator assembly comprises one or more simulated eyeballs, and each simulated eyeball coupled to a respective motor unit. Each simulated eyeball is configured to perform movement as enabled by the coupled motor units. The simulated eyeball comprises a laser diode located at the center of the eyeball, with the laser diode providing a 3D projection through a simulated pupil located on the simulated eyeball, the projection normal to the simulated pupil. In some embodiments, the oculomotor simulator assembly comprises a motor assembly with one or more motor units, with the motor assembly configured to: receive instructions from a control unit, the instructions specifying movement for one or more simulated eyeballs, enable movement of the simulated eyeball through the coupled motor unit based on the received instructions. In some embodiments, the oculomotor simulator assembly comprises a control unit that is configured to: receive instructions specifying movement of the simulated eyeball from an I/O interface and provide instructions to the motor assembly based on the received instructions from the I/O interface.

In some embodiments, the device assembly may additionally comprise an eye-tracking device assembly. The eye-tracking device assembly comprises at least one eye-tracking device (e.g., an eye-tracking camera, scleral eye coil, motion sensor, etc.). The eye-tracking device is configured to track the pupil of the simulated eyeball during the specified movement of the simulated eyeball, and providing 3D gaze direction for the simulated eyeball based on the tracked pupil of the simulated eyeball.

In some embodiments, the device assembly may comprise a validation system that is configured to: receive projection data based on the 3D projection from the laser diodes located at the center of the simulated eyeball, receive 3D gaze direction for the simulated eyeball from the eye-tracking device that is tracking the simulated eyeball, and establish accuracy of the eye-tracking device assembly based on the received projection data and the received 3D gaze direction.

In some embodiments, the oculomotor simulator assembly is mounted on a frame, and the frame is configured to enable movement of the one or more simulated eyeballs via the coupled one or more motor units.

In some embodiments, the instructions specifying movement of the simulated eyeball that are received by the motor assembly may be programmed input to the control unit via the I/O interface, or manual input to the control unit via the I/O interface.

In some embodiments, the programmed input to the control unit may be, at least partially, a replay of previously recorded real human eye movements.

In some embodiments, the oculomotor assembly is mounted on a frame that is configured to be stationary relative to a platform.

In some embodiments, the oculomotor assembly is mounted on a frame that is configured to be capable of movement with respect to a platform.

In some embodiments, the movement relative to the platform simulates human head movements.

In some embodiments, the simulated eyeballs may comprise any of: selectable simulated eyeball structure parameters, selectable simulated pupil parameters, selectable simulated iris parameters, selectable inter-eyeball distance between two or more simulated eyeballs within the oculomotor assembly, selectable simulated eyeball locations within the oculomotor assembly, selectable simulated eyeball alignments within the oculomotor assembly, and selectable laser diode parameters.

In some embodiments, the system comprises a computer processor and a non-transitory computer readable storage medium for storing instructions that when executed by a computer processor cause the computer processor to perform the steps for determining the accuracy of an eye-tracking device that is performing eye-tracking of one or more simulated eyeballs during a specified movement as described herein.

BRIEF DESCRIPTION OF THE DRAWINGS

FIG. 5 is a flowchart illustrating a process for performing validation of an eye-tracking system using independent tracking information from an oculomotor simulator assembly, in accordance with one or more embodiments.

Figure 1A:
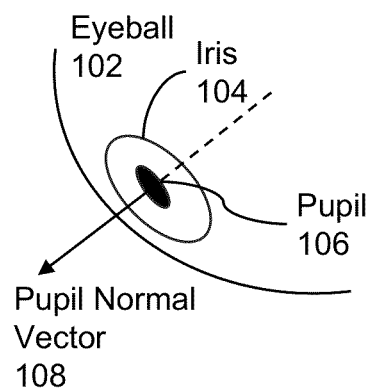
FIG. 1A depicts herein a model of an eyeball, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

DETAILED DESCRIPTION

The present disclosure generally relates to an oculomotor simulator with simulated eyeballs, and specifically relates to determining the accuracy of 3D gaze detection in eye-tracking devices using the oculomotor simulator.

Eye-tracking refers to the process of detecting the direction of a user's gaze, which may detect angular orientation of the eye in 3D space. Additionally, eye-tracking may detect a location of the eye (e.g., the center of the eye), changes in the location of the eye, a torsion (i.e., the roll of the eye about the pupillary axis) of the eye, a shape of the eye, a current focal distance of the eye, a dilation of the pupil, or other features of the eye's state. Eye-tracking is essential for the understanding of certain visual and oculomotor disorders. Some disorders add complexities to eye-tracking approaches, including disorders such as large misalignment between the visual (fixational locus to object) and pupillary axes, decreased fixational accuracy and increased fixational instability, and potential misalignment of the eyes. The advent of eye-tracking systems allows for a more complete understanding of eye and gaze movement deficits that occur in oculomotor disorders.

Eye-tracking systems may include one or more eye-tracking devices, such as eye-tracking cameras, to receive information about a tracked eye and subsequently use computer vision-based algorithms for eye-tracking, including estimating 3D gaze direction of the tracked eye by optimizing parameters of an eye model. Such algorithms may have certain built-in assumptions, such as the alignment of the visual and pupillary axes and eye convergence on the target during calibration. However, such assumptions may be violated in individuals with oculomotor and visual disorders, leading to greater calibration and eye-tracking errors when using these devices. For example, misalignment of the visual axis and reduction in fixational stability due to eccentric fixation, difficulty in finding or resolving a calibration target, nonlinear eye placement on calibration targets (e.g., due to multiple fixational loci used throughout calibration), or deficits in saccadic latency and accuracy could all play a role in reducing calibration accuracy of an eye-tracking device.

Embodiments described herein provide an oculomotor simulation system and method to evaluate these factors independently as well as in combination, and establish ground truth values for eye-movements such that it is possible to assess whether measured changes in eye-tracking accuracy and effectiveness are the result of some of the oculomotor changes associated with disorders, or due to poor tracking by an eye-tracking device itself.

Embodiments of the oculomotor simulation system simulate a range of oculomotor behavior. The behaviors are performed by simulated eyeballs that are coupled to motors to drive desired movement of the eyeballs. In embodiments described herein, manual or programmed calibration may be performed with respect to the motor drivers for the range of desired motion behaviors by the simulated eyeballs before the oculomotor simulation system is employed in conjunction with eye-tracking devices for validating them.

Embodiments of the oculomotor simulation system described herein may be used in conjunction with computer vision-based eye-tracking devices in order to perform validation and assessment of the performance of the computer vision-based eye-tracking devices during a range of oculomotor behaviors including conjugate and dis-conjugate eye movement behaviors, such as ocular saccades, smooth ocular pursuit in 3-dimensional space, ocular blinks, changes in ocular movement direction, and changes in ocular movement speed, as well as head and eye movement behaviors that are associated with visual/oculomotor deficits (e.g., eccentric fixation, fixational instability, dis-conjugate eye movements/fixation, etc.). The oculomotor simulation system described herein is calibrated through a range of simulated eyeball movements.

FIG. 1A depicts herein a model 100 of an eyeball 102, in accordance with one or more embodiments. The depicted eyeball 102 has an iris 104 with a pupil 106 that is located within the iris 104. The pupil normal vector 108 is termed the 3D gaze direction, or gaze, of the eyeball 102. The projection of the pupil normal vector 108 on a screen of an eye-tracking camera that is tracking the eyeball 102 may be used to establish the gaze of the eyeball 102.

Figure 1B:
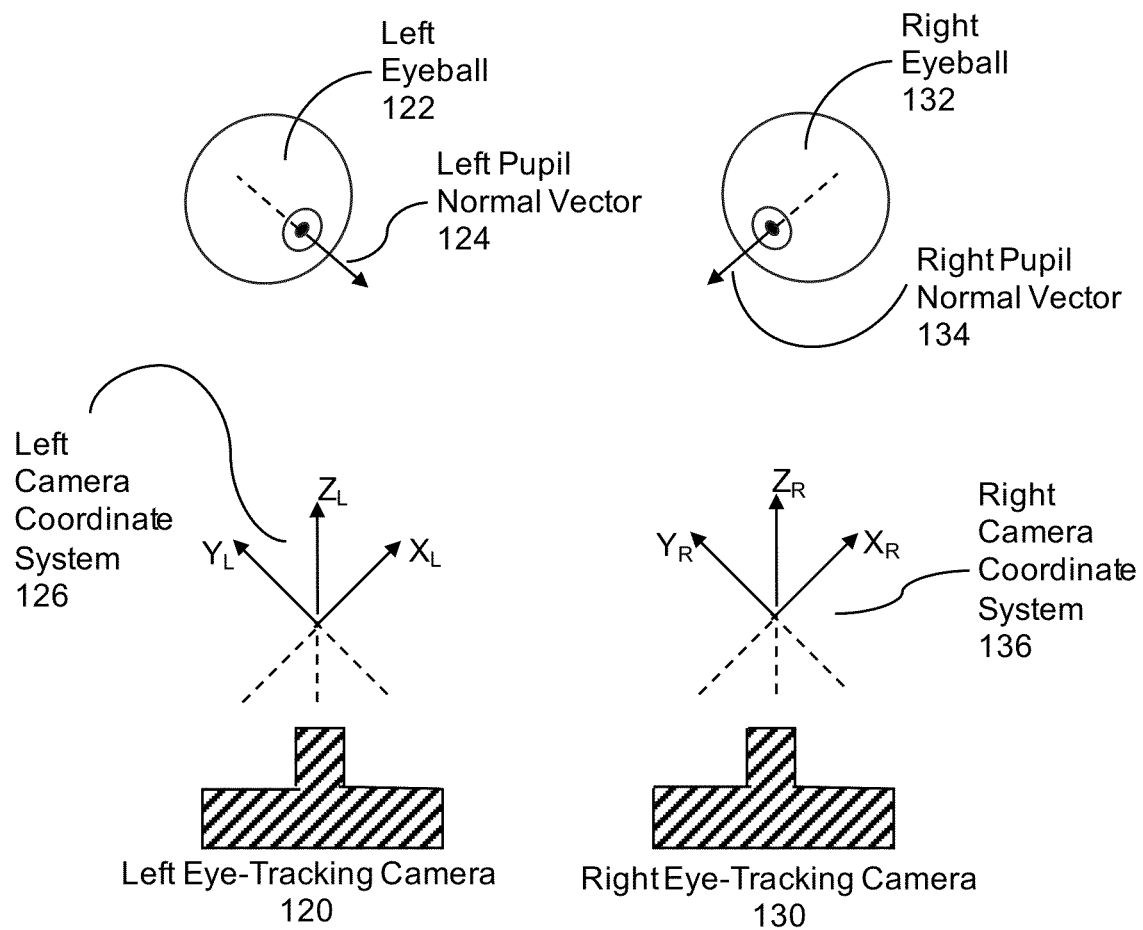
FIG. 1B depicts herein a camera-based eye-tracking model, in accordance with one or more embodiments.

FIG. 1B depicts herein a schematic diagram of a camera-based eye-tracking model 110, in accordance with one or more embodiments. The model 110 includes a left eye-tracking camera 120 that is tracking a left eyeball 122, and a right eye-tracking camera 130 that is tracking a right eyeball 132. The 3D gaze direction being tracked by the left eye-tracking camera 120 is the left pupil normal vector 124, and is determined by applying computer vision based algorithms (e.g., ellipse-fitting models) on the image of the pupil of the eyeball 122 as projected onto the left camera coordinates $(X_L, Y_L, Z_L)$ 126. Similarly, the 3D gaze direction being tracked by the right eye-tracking camera 130 is the right pupil normal vector 134, and is determined by applying computer vision-based algorithms (e.g., ellipse-fitting models) on the image of the pupil of the eyeball 132 as projected onto the right camera coordinates $(X_R, Y_R, Z_R)$ 136. The position of an eyeball may be viewed as the location of the center of the pupil of the eyeball relative to the camera coordinate system of the camera that is eye-tracking that eyeball. While FIG. 1B depicts camera-based eye-tracking using the left eye-tracking camera 120 and the right eye-tracking camera 130, these may be replaced by other forms of eye-tracking devices without loss of limitation.

Figure 2:
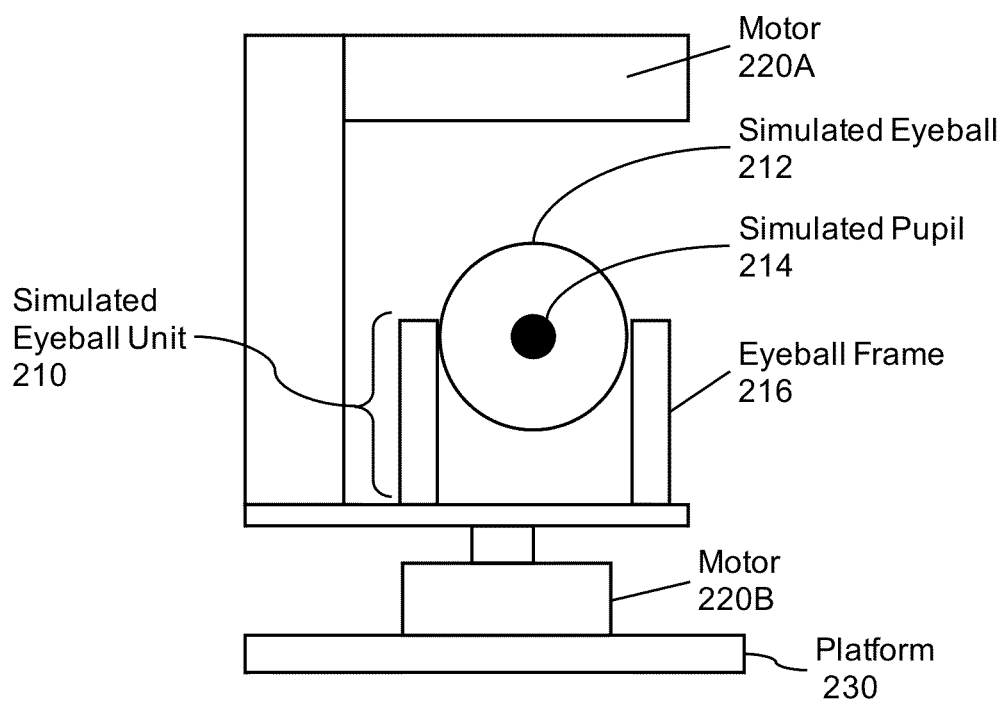
FIG. 2 depicts herein a schematic diagram of an oculomotor simulator device, in accordance with one or more embodiments.

FIG. 2 depicts herein a schematic diagram of an oculomotor simulator device 200, in accordance with one or more embodiments. The oculomotor simulator device 200 depicts a simulated eyeball unit 210, a set of motors 220, and a platform 230.

In embodiments described herein, the simulated eyeball unit 210 includes a simulated eyeball 212 with a simulated pupil 214 that is coupled to an eyeball frame 216.

In embodiments described herein, the simulated eyeball 212 may be a spherical or semispherical object. In some embodiments, the simulated eyeball 212 may be a 3D-printed object. In some embodiments, the simulated eyeball 212 may be a 3D non-spherical or non-semi-spherical object. In some embodiments, the simulated eyeball 212 may have dimensions that are similar to that of an adult human eyeball (e.g., 30 mm diameter as compared to a human eyeball of 21-27 mm). A simulated eyeball 212 may have a simulated pupil 214 located on it. In some embodiments, the simulated pupil 214 may be a colored circle with an aperture in the center of the simulated pupil 214. In some embodiments, the colored circle may be black. In some embodiments, the aperture in the center of the simulated pupil 214 may have a laser diode (not shown) located in the center of the simulated pupil of the simulated eyeball 212. The laser diode provides a 3D projection of where the simulated eyeball 212 is pointed, allowing external verification of the 3D gaze direction, i.e., the pupil normal vector, as obtained by any eye-tracking device that may be tracking the gaze of the simulated eyeball 212. In some embodiments, the laser diode may be located in any known location within the simulated eyeball 212. In some embodiments, the laser diode may be powered using a 5V supply.

In embodiments described herein, the eyeball frame 216 enables mounting of the simulated eyeball 212 such that the simulated eyeball 212 may move when driven by the set of motors 220. Thus, the eyeball frame 216 may enable the simulated eyeball 212 to have linear motion in any combination of: left-right (i.e., horizontal) motion, up-down (i.e., vertical) motion, and forward-backward motion. In some embodiments, the eyeball frame 216 may enable the simulated eyeball 212 to have rotational motion along one, two, or three degrees of rotation about chosen coordinate axes. In some embodiments, the eyeball frame 216 may be constructed out of metal (e.g., lightweight aluminum), plastic, wood, or other materials that permit coupling to the simulated eyeball 212 and enable movement of the simulated eyeball 212. In some embodiments, the eyeball frame 216 may be an adjustable articulated structure.

In some embodiments, the set of motors 220 (i.e., 220A and 220B) may be coupled to the eyeball frame 216. In some embodiments, the set of motors 220 may include one or more stepper motors. In some embodiments, each motor from the set of motors may be coupled to the eyeball frame 216 to enable the simulated eyeball 212 to have linear or rotational motion as described above. In some embodiments, the motors 220 enabling specific motions of the simulated eyeball 212 may be located in any of: above, to the side of, or behind the simulated eyeball 212 so that they do not obstruct eye-tracking behavior of cameras of an eye-tracking device that may be tracking movement of the simulated eyeball 212, and so that the motors 220 do not obstruct projection of the laser diode that may be located in the center of a simulated eyeball 212. In some embodiments, the motors are powered by a 7.5V, ≥1.5 A standard power adapter.

The simulated eyeball unit 210 is coupled to the platform 230. The motors 220 may also enable movement of the eyeball unit 210 with respect to the platform 230. The platform 230 may include adjustable articulated mounts (not shown) for positioning eye-tracking devices (e.g., left camera 120 and right camera 130 of FIG. 1B) of an eye-tracking system such that the cameras may track the movements of the simulated eyeball 212 in the eyeball unit 210.

In some embodiments, the eyeball frame 216 for multiple simulated eyeball units 210 may be constructed as part of a single frame structure, while in other embodiments, the eyeball frames 216 for each of the multiple eyeball units 210 may be separate eyeball frame structures.

In some embodiments, the oculomotor simulator device 200 may simulate a human head. In these embodiments, there may be two simulated eyeball units 210, each unit 210 with its individual simulated eyeball 212 and eyeball frame 216. There may be independent motor units 220A and 220B for each of the two simulated eyeball units 210. In addition to independent simulated eyeball movements of the individual simulated eyeballs 212, the oculomotor simulator device 200 may enable simulation of human head movements by enabling linear and/or rotational movement of the simulated eyeball units 210 for both the simulated eyeballs 212 relative to the platform 230 such that the movement simulates natural and unnatural human head movements. These movements may be enabled jointly for the two simulated eyeball units 210 by the motor units 220B, or independently for each of the simulated eyeball units 210, relative to the platform 230. In some embodiments, the movement of the simulated eyeballs 212 may be based on any of; simulating eye movements alone, simulating head movements alone, or simulating a combination of eye movements and head movements.

Embodiments of the various elements depicted in FIG. 2 may be replicated using manual manufacturing design or using 3D printed design elements.

While FIG. 2 shows an example oculomotor simulator device 200 including one simulated eyeball unit 210, one set of motors 220 and one platform 230, in other embodiments any number of these components may be included in the device 200. For example, there may be multiple simulated eyeball units 210, multiple sets of motors 220, and multiple platforms 230 that may be partially or wholly connected to each other, or unconnected. In alternative configurations, different and/or additional components may be included in the device 200. Additionally, functionality described in conjunction with one or more of the components shown in FIG. 2 may be distributed among the components in a different manner than described in conjunction with FIG. 2 in some embodiments. For example, some or all of the functionality of the platform 230 may be provided by the eyeball frame 216.

Figure 3:
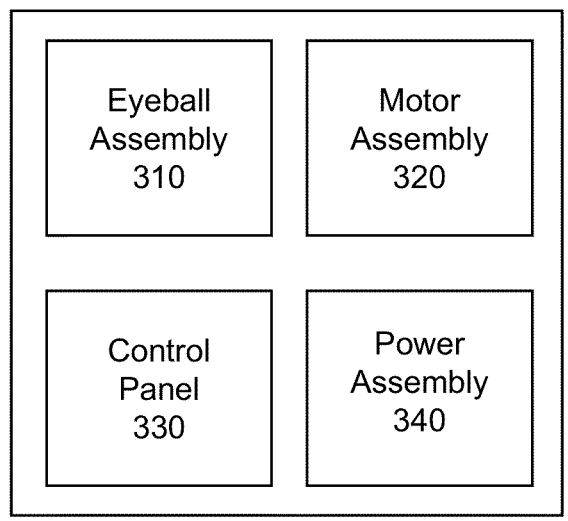
FIG. 3 is a block diagram of an oculomotor simulator assembly, in accordance with one or more embodiments.

FIG. 3 is a block diagram of an oculomotor simulator assembly 300, in accordance with one or more embodiments. The oculomotor simulator device 200 depicted in FIG. 2 may be an embodiment of the oculomotor simulator assembly 300.

The oculomotor simulator assembly 300 may include an eyeball assembly 310, a motor assembly 320, a control panel 330, and a power assembly 340. Some embodiments of the oculomotor simulator assembly 300 may have different components than those described here. Similarly, in some cases, functions can be distributed among the components in a different manner than is described here.

The eyeball assembly 310 includes one or more simulated eyeballs, each coupled to an eyeball frame. An eyeball frame may be coupled to a platform.

The eyeball 212 depicted in FIG. 2 may be an embodiment of the simulated eyeballs in the eyeball assembly 310. In various embodiments, the eyeball assembly 310 may include a single simulated eyeball or may include multiple simulated eyeballs (e.g., two eyeballs to simulate human eye physiology, i.e., a left simulated eyeball and a right simulated eyeball). In some embodiments, the eyeball assembly 310 may have a set of simulated eyeballs from which a subset of simulated eyeballs may be selected for functionality with respect to a given application scenario. In embodiments herein, the simulated eyeballs may have any of: selectable simulated eyeball structure parameters (e.g., eyeball size, eyeball color, eyeball shape, eyeball material, etc.), selectable simulated pupil parameters (e.g., pupil size, pupil color, pupil shape, etc.), selectable simulated iris parameters (e.g., iris size, iris color, iris shape, presence or absence of iris, etc.), selectable inter-eyeball distance between simulated eyeballs within the oculomotor assembly, selectable simulated eyeball locations within the oculomotor assembly, and selectable simulated eyeball alignments within the oculomotor assembly (e.g., vertical, horizontal, or depth offset, absolute and relative to each other).

In some embodiments, a simulated eyeball in the eyeball assembly 310 may have a laser diode located in the center of the simulated eyeball that may project through an aperture in the center of a simulated pupil on the simulated eyeball. The laser projection through the aperture provides ground truth estimation of the pupil normal vector, i.e., the 3D gaze direction for the simulated eyeball. The laser diode described with respect to simulated eyeball 212 in FIG. 2 may be an embodiment of the laser diode in a simulated eyeball in the eyeball assembly 310. In embodiments described herein, there may be selectable laser diode parameters (e.g., laser color, laser intensity, laser wavelength, alignment, position of projection, etc.). Some embodiments may include having multiple apertures in the simulated pupil of the simulated eyeball for different laser diodes, so that optional optical and visual axis alignment testing may be performed. In some embodiments, the inner surface of the eyeball may be modified to have a retina-like surface that may be illuminated from external sources for tracking and perception purposes during eye motion.

The eyeball frame 216 depicted in FIG. 2 may be an embodiment of the eyeball frame in the eyeball assembly 310. In various embodiments, movement of the simulated eyeballs is enabled through the coupled eyeball frames in the eyeball assembly 310. The enabled movement of the simulated eyeballs is driven by the motor assembly 320. Thus, the eyeball frame may enable the simulated eyeball to have linear motion in any combination of: left-right (i.e., horizontal) motion, up-down (i.e., vertical) motion, and forward-backward motion. The eyeball frame may enable the simulated eyeball to have rotational motion about one, two, or three degrees of rotation with respect to a known coordinate system. The enabled movements of a simulated eyeball in the eyeball assembly 310 may include both independent as well as synchronized simulated eyeball movements and positioning with some or all of the other simulated eyeballs in the eyeball assembly 320. The enabled movements may be either static or dynamic in form. The movements may be enabled for simulating a range of conjugate and dis-conjugate eye movement behaviors, such as ocular saccades, smooth ocular pursuit in 3-dimensional space, ocular blinks, changes in ocular movement direction, and changes in ocular movement speed, as well as eye movement behaviors that are associated with visual/oculomotor deficits (e.g., eccentric fixation, fixational instability, dis-conjugate eye movements/fixation, etc.). The enabled movements of a simulated eyeball may be caused by movement of the eyeball frame (e.g., movement of the simulated eyeball unit 210 in FIG. 2) relative to a platform to which the frame may be affixed. In this instance, specific human head movements may be simulated by enabling movement of the simulated eyeball units (and eyeball frames) for both the simulated eyeballs relative to the platform. The movements of the simulated eyeballs may simulate any of: eye movements in conjunction with head movements or isolated eye movements or isolated head movements.

In some embodiments, the eyeball assembly 310 enables the laser diodes located in the center of the simulated eyeballs to project in concurrence with the enabled movements of the simulated eyeballs. The enabled projection of the laser diodes may be driven by instructions received at the eyeball assembly 310 from the control panel 330.

In some embodiments, the eyeball assembly 310 includes a platform to which an eyeball frame is coupled. In various embodiments, individual eyeball frames may be mounted on individual platforms, several eyeball frames may be mounted on an individual platform, or there may be some combination thereof. In some embodiments, the platforms may enable the mounting of one or more eye-tracking devices. For example, if the eye-tracking device includes cameras, such cameras may be coupled to an individual platform or to multiple platforms, through a rigid mount or adjustable articulated mounts, or a combination thereof.

The motor assembly 320 includes one or more motors that drive movement of the simulated eyeballs in the eyeball assembly 310 via the coupled eyeball frames. The motors 220 described in FIG. 2 may be embodiments of the motors in the motor assembly 320. In some embodiments, the motor assembly 320 may include one or more stepper motors, where each stepper motor may be coupled to an individual eyeball frame to enable the simulated eyeballs to have linear or rotational motion. In embodiments described herein, manual or programmed calibration may be performed of the desired movements of the simulated eyeballs in the eyeball assembly 310 with respect to the motor drivers in the motor assembly 320 before the oculomotor simulator assembly is used in conjunction with an eye-tracking device assembly for validation purposes. In some embodiments, the motors enabling specific motions of the simulated eyeballs may be located in any of: above, to the side of, or behind the simulated eyeball so that they do not obstruct eye-tracking behavior of cameras of an eye-tracking device, and that they do not obstruct projection of the laser diode that may be located in the center of a simulated eyeball.

In embodiments described herein, the control panel 330 may provide instructions to the motor assembly 320 regarding specified movements of the simulated eyeballs in the eyeball assembly 310. In some embodiments, the control panel 330 may provide instructions to the eyeball assembly 310 regarding enabling 3D projection of the laser diodes in the simulated eyeballs in concurrence with specified movements of the simulated eyeballs in the eyeball assembly 310. In some embodiments, the control panel 330 may provide independent signals to the motors in the motor assembly 320 regarding the type of movement (i.e., rotational/translational), the direction of movement, and the initiation of movement.

The control panel 330 may receive instructions regarding movements to be performed by the simulated eyeballs in the eyeball assembly, as well as instructions regarding laser diode projection from one or more of the simulated eyeballs in the eyeball assembly 310. These instructions may be received as programmed input to the control panel 330 via an I/O interface that communicates with the control panel 330 or as manual input from a user of the oculomotor simulator assembly 300 through a console via an I/O interface.

In embodiments described herein, the power assembly 340 may supply power to various components in the eye assembly 310, motor assembly 320, and to the control panel 330. In some embodiments, the power assembly 340 may power the laser diodes in the eyeball assembly 310 using a 5V supply. In some embodiments, the power assembly 340 may power the motors in the motor assembly 320 using a 7.5V, ≥1.5 A standard power adapter. In some embodiments, the power assembly 340 may supply required power to the various components through alternate sources (e.g., battery sources, via a connection to a computer, etc.).

While FIG. 3 shows an example oculomotor simulator assembly 300 including eyeball assembly 310, one motor assembly 320, one control panel 330, and one power assembly 340, in other embodiments, any number of these components may be included in the assembly 300. In alternative configurations, different and/or additional components may be included in the assembly 300. Additionally, functionality described in conjunction with one or more of the components shown in FIG. 3 may be distributed among the components in a different manner than described in conjunction with FIG. 2 in some embodiments. For example, some or all of the functionality of the power assembly 340 may be provided by the motor assembly 320.

Figure 4:
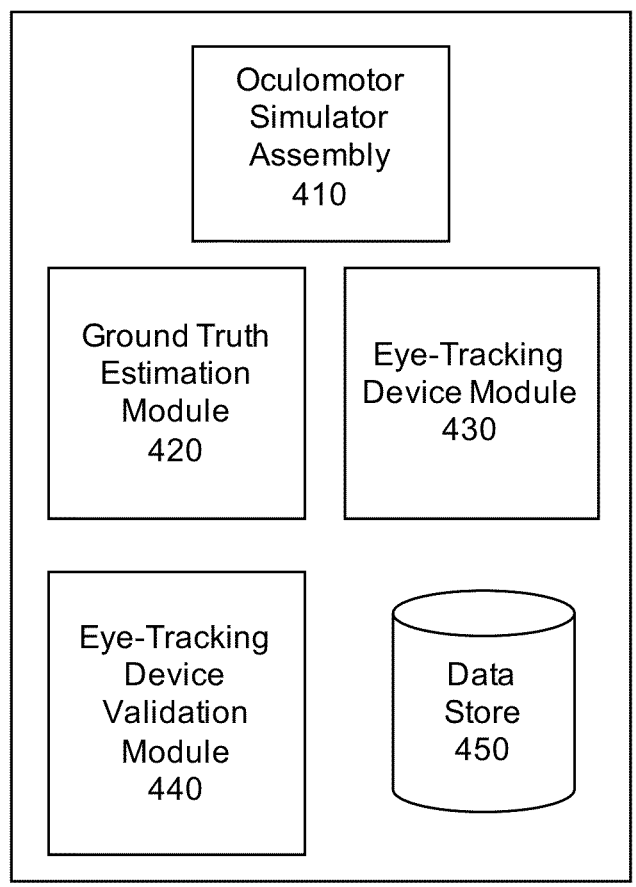
FIG. 4 is a block diagram of an eye-tracking validation system that includes an oculomotor simulator assembly and an eye-tracking module, in accordance with one or more embodiments.

FIG. 4 is a block diagram of eye-tracking validation system 400, in accordance with one or more embodiments. The eye-tracking validation system 400 performs validation of eye-tracking devices by providing ground truth values for specified movements of simulated eyeballs in an oculomotor simulator device. In embodiments described herein, the eye-tracking validation system 400 includes an oculomotor simulator assembly 410, a ground truth estimation module 420, an eye-tracking device module 430, an eye-tracking device validation module 440, and a data store 450. Some embodiments of the eye-tracking validation system 400 have different components than those described here. Similarly, in some cases, functions can be distributed among the components in a different manner than is described here.

The oculomotor simulator assembly 410 enables controlled movement of simulated eyeballs and provides establishment of ground truth values regarding the movement of the simulated eyeballs. The oculomotor simulator assembly 410 consists of one or more independently controlled simulated eyeballs that can have controlled linear and rotational movements and that are calibrated for eye-tracking using standard eye-tracking calibration movement routines. The standard eye-tracking calibration movement routines may be obtained from the data store 450. The simulated eyeballs may be coupled to eyeball frames that may, in turn, be mounted on platforms. The oculomotor simulator assembly 300 described with respect to FIG. 3 is an embodiment of the oculomotor simulator assembly 410. The simulated eyeballs may be positioned both statically or dynamically for a range of conjugate and dis-conjugate behaviors, including saccades and smooth pursuit in the 3-dimensional space, as well as emulating behaviors associated with visual/oculomotor deficits (e.g., eccentric fixation, fixational instability, disconjugate eye movements/fixation, etc.).

The oculomotor simulator assembly 410 may generate the specified movements of a simulated eyeball based on movement data retrieved from the data store 450. In some embodiments, the oculomotor simulator assembly 410 may periodically request movement data from a movement server. In response to the request, the oculomotor simulator assembly 410 may receive a possibly updated movement data from the movement server through a network and may store this movement data at the data store 450. In some embodiments, the module 410 may periodically receive updated data from the movement server through the network without having to request the server.

As described with respect to the eyeball assembly 310 in FIG. 3, a laser diode may be located in the center of the simulated eyeball that projects through the center of a simulated pupil on the simulated eyeball. The oculomotor simulator assembly 410 enables the laser diodes in the simulated eyeballs to project in concurrence with the movements of the simulated eyeballs. The oculomotor simulator assembly 410 stores the 3D projection data generated by the laser diodes in concurrence with the movements of the simulated eyeballs in the data store 450.

The ground truth estimation module 420 generates ground truth estimates for the movement of the simulated eyeballs in the oculomotor simulator assembly 410. The ground truth estimation module 420 collects the projection data that is generated by the laser diodes in concurrence with the movements of the simulated eyeballs. Subsequently, the ground truth estimation module 420 generates ground truth estimates for the pupil normal vector of the simulated eyeball during movement (i.e., the 3D gaze direction for the simulated eyeball during movement) as described with respect to pupil normal vector 108 in FIG. 1A. The ground truth estimation module 420 may store the generated ground truth estimates during the enabled movements of the simulated eyeball in the data store 450. In embodiments described herein, the 3D position/location information for eye-tracking devices relative to a location of the simulated eyeballs prior to enabled movement may be retrieved by the ground truth estimation module 420 from the data store 450. The ground truth estimation module 420 may also retrieve movement data associated with the specified movements of the simulated eyeballs from the data store 450. The ground truth data estimation module 420 may employ the retrieved 3D location information in combination with retrieved movement data to establish 3D gaze position information of the simulated eyeballs (e.g., the locations of the center of the pupils of the simulated eyeballs) during the enabled movement. The ground truth estimation module 420 may store the 3D gaze position information in the data store 450 along with the 3D gaze direction during enabled movement as ground truth estimates for the 3D gaze.

The eye-tracking device module 430 may include one or more eye-tracking devices that are tracking the movement of corresponding one or more simulated eyeballs in the oculomotor simulator assembly 410. The eye-tracking device module 430 may include eye-tracking devices such as eye-tracking cameras that may use computer vision-based algorithms for performing eye-tracking, including estimating gaze direction and gaze position by optimizing parameters of an eye model. For instance, in some embodiments, the computer vision based algorithms may involve models for ellipse-fitting with respect to projections of a pupil of a tracked eye on the screen of an eye-tracking camera of the eye-tracking device. The eye-tracking device module 430 may retrieve, from the data store 450, the algorithms and associated data for estimating the gaze direction during tracking. The eye-tracking device module 430 may include rigid or adjustable articulated mounts for positioning the eye-tracking sensors such that the sensors can track the movements of the simulated eyeballs. The mounts may be coupled to one or more platforms on the oculomotor simulator assembly 410. The left camera 120 and the right camera 130 of FIG. 1B may be embodiments of the eye-tracking cameras of the eye-tracking device module 430. Thus, left camera 120 in FIG. 1B may be tracking the pupil (e.g., pupil 106 of FIG. 1A) of a left eyeball 122 and estimating the location of the center of the pupil as well as the pupil normal vector 124 based on using ellipse-fitting models on the image of the projected pupil on the screen of the eye-tracking cameras 120. The eye-tracking device module 430 may store the estimated pupil center locations as well as pupil normal vectors during the movements of the simulated eyeball in the data store 450. The 3D location of the eye-tracking camera devices of the eye-tracking device module 430 is assumed to be known relative to a location of the simulated eyeballs prior to any enabled movement. This 3D location information may be stored in the data store 450.

The eye-tracking device validation module 440 assesses the performance of eye-tracking devices and provides estimates for the accuracy of the eye-tracking performed by such devices. The eye-tracking device validation module 440 obtains, from the data store 450, the stored ground truth values for specified movements of the simulated eyeball, as generated by the ground truth estimation module 420. The eye-tracking device validation module 440 also obtains, from the data store 450, the estimated pupil center locations as well as pupil normal vectors generated by the eye-tracking device module 430 for the same specified movements of the simulated eyeball. The eye-tracking device validation module 440 determines the accuracy of the eye-tracking devices for a specified movement of the simulated eyeball based on a comparison of the ground truth estimates and the estimated pupil normal vectors for the specified movement. In some embodiments, the eye-tracking device validation module 440 may use the stored ground truth values for the 3D gaze position (e.g., the location of the center of the pupil) from relative camera position and/or movement data provided to the motor assembly) as well as the 3D gaze direction (from the laser projection data) to perform the validation, while in other embodiments, the eye-tracking device validation module 440 may use the stored ground truth values for just the 3D gaze direction to perform the validation. In some embodiments, the eye-tracking device validation module 440 combines the accuracy of the eye-tracking devices as established for a set of specified movements to establish the overall accuracy of the eye-tracking device. The eye-tracking device validation module 440 may store the estimated accuracy of the eye-tracking devices in the data store 450. In some embodiments, estimated accuracy of the eye-tracking devices may be stored in the data store 450 in association with the specified movements used to obtain the ground truth estimates and the pupil normal vectors.

The data store 450 stores data for use by the eye-tracking validation system 400. Data in the data store 450 may include standard eye-tracking calibration movement routines used to calibrate the oculomotor simulator assembly 410. The data store 450 may store movement data for use in enabling controlled movements of the simulated eyeballs in the oculomotor simulator assembly 410. The data store 450 may receive the calibration movement routines and the movement data from a user via a console through an I/O interface communication with the eye-tracking validation system 400, through a remote server via networked capabilities of the eye-tracking validation system 400, or some combination thereof. The data store 450 may store the laser projection data generated by the oculomotor simulator assembly 410. The data store 450 may store the generated ground truth estimates for the movements of the simulated eyeball as generated by the ground truth estimation module 420. The data store 450 may store algorithms and associated data for estimating the 3D gaze direction and 3D gaze position during tracking for use by the eye-tracking device module 430. The data store may store the estimated pupil normal vectors as well as the estimated pupil center locations for the movements of the simulated eyeball as generated by the eye-tracking device module 430. The data store 450 stores the accuracy of the eye-tracking devices as estimated by the eye-tracking device validation module 440. The data store 450 may display the accuracy of the eye-tracking devices to a user via a console through an I/O interface communication with the eye-tracking validation system 400.

FIG. 5 is a flowchart 500 for determining accuracy of an eye-tracking device, in accordance with one or more embodiments. The process shown in FIG. 5 may be performed by embodiments of an eye-tracking validation system such as eye-tracking validation system 400 as described herein. Other entities may perform some or all of the steps in FIG. 5 in other embodiments. Embodiments may include different and/or additional steps or perform the steps in different orders.

The eye-tracking validation system receives 510 instructions at an oculomotor simulator. The oculomotor simulator may include one or more simulated eyeballs. The instructions may specify movement for each simulated eyeball from a set of one or more simulated eyeballs. In some embodiments, the movements may be specified for a selected set of simulated eyeballs. The selection of a set of simulated eyeballs for which the movements may be specified by the instructions may include implicit selection or explicit selection. For example, implicitly selecting a set of simulated eyeballs for which movement is specified may involve sending specified movement instructions to eyeballs frames associated with only the selected set of simulated eyeballs. Explicitly selecting a set of simulated eyeballs for which movement is specified may involve a system which is configured to enable selection of specific simulated eyeballs (i.e., selecting by name, by number, by location, by specifying a subset, etc., or a combination thereof). The specified movements may be any of: specified rotation parameters for the simulated eyeball, and specified translational motion parameters for the simulated eyeball.

The eye-tracking validation system enables 520 movement of the simulated eyeballs based on the received instructions.

The eye-tracking validation system obtains 530 a ground-truth value for 3D gaze direction of the simulated eyeball during the specified movement. Obtaining the ground-truth value for the 3D gaze direction of the simulated eyeball during the specified movement may involve: receiving projection data based on 3D projection during the specified movement from a laser diode that is located at the center of the simulated eyeball, determining the 3D gaze direction for the simulated eyeball based on the received projection data, and establishing the determined 3D gaze direction for the simulated eyeball as the ground-truth value for the 3D gaze direction for the simulated eyeball during the specified movement. In some embodiments, the eye-tracking validation system may additionally obtain 530 ground-truth value for 3D gaze position of the simulated eyeball during the specified movement along with the ground truth value for the 3D gaze direction. This may be obtained based on the known specified movement data as well as known simulated eyeball locations to establish the location of the center of the pupil of the simulated eyeball during the specified movement.

The eye-tracking validation system determines 540 the accuracy of an eye-tracking device. The accuracy is determined based on received values for 3D gaze direction of the selected simulated eyeballs from the eye-tracking device performing eye-tracking of the selected simulated eyeballs during the specified movement and the obtained ground-truth values for the selected simulated eyeballs. In some embodiments, the accuracy may be determined based on the ground truth values for the 3D gaze direction estimation as well as ground truth values for the 3D gaze position estimation.

Figure 6:
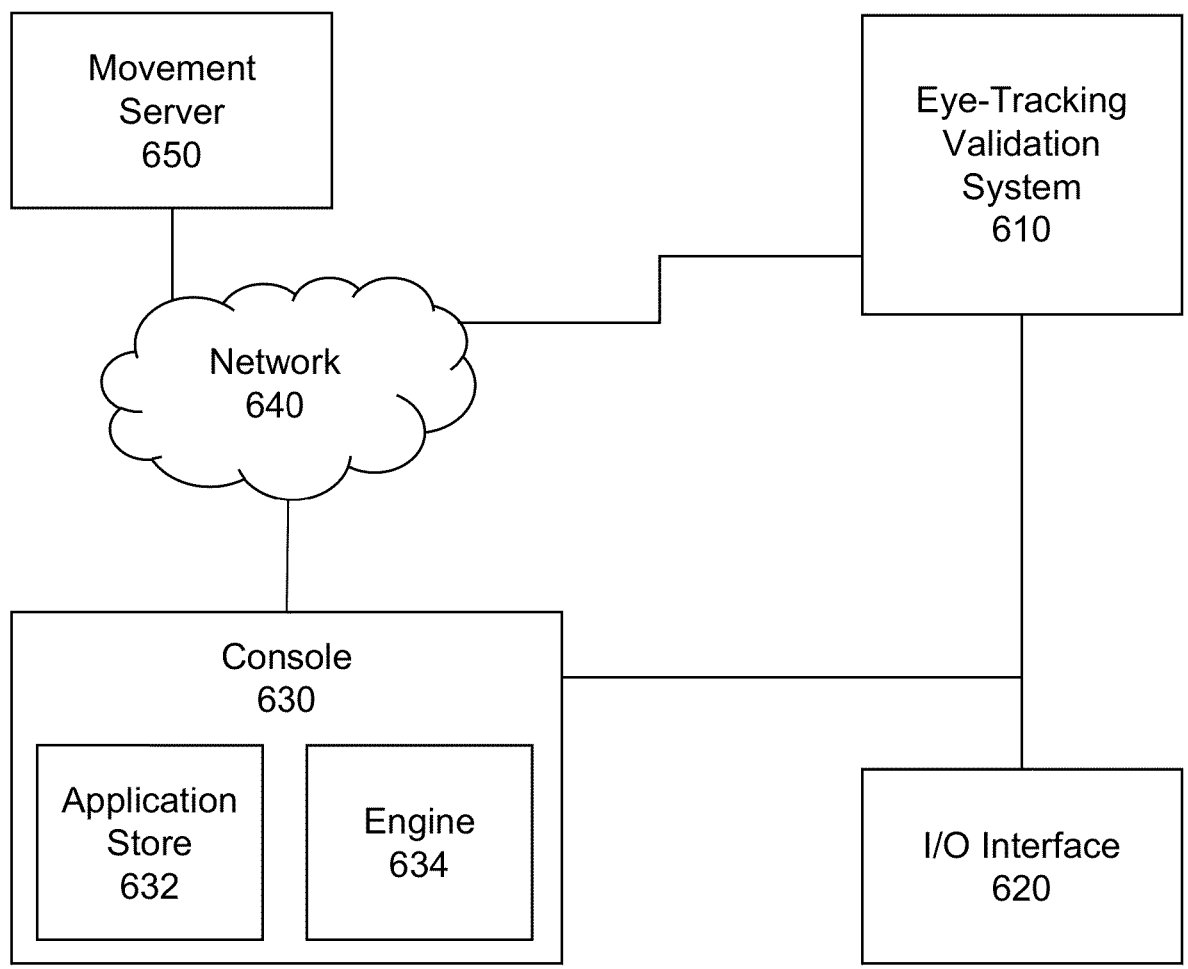
FIG. 6 is a depiction of an example system including an eye-tracking validation system, an I/O interface, a console, and a movement server, all of which may be connected by a network, in accordance with one or more embodiments.

FIG. 6 is a system 600 that includes an eye-tracking validation system 610, in accordance with one or more embodiments. In some embodiments, the eye-tracking validation system 610 may be the eye-tracking validation system 400 of FIG. 4. The system 600 shown in FIG. 6 includes the eye-tracking validation system 610, an input/output (I/O) interface 620 that is coupled to a console 630, the network 640, and a movement server 650. While FIG. 6 shows an example system 600 including one eye-tracking validation system 610 and one I/O interface 620, in other embodiments any number of these components may be included in the system 600. For example, there may be multiple eye-tracking validation systems 610 each having an associated I/O interface 620, with each eye-tracking validation system 610 and I/O interface 620 communicating with the console 630. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 630 may be provided by the eye-tracking validation system 610.

The eye-tracking validation system 610 may include (not shown) an oculomotor simulator assembly, a ground truth estimation module, an eye-tracking device module, an eye-tracking device validation module, and a data store. The eye-tracking validation system 400 described with respect to FIG. 4 is an embodiment of the eye-tracking validation system 610.

The I/O interface 620 is a device that allows a user to send action requests and receive responses from the console 630. An action request is a request to perform a particular action. For example, an action request may be an instruction to start or end capture of image or video data by the eye-tracking device in the eye-tracking device module or an instruction to perform a particular action by the oculomotor simulator assembly. The I/O interface 620 may include one or more input devices. Example input devices include: a keyboard, a mouse, a game controller, or any other suitable device for receiving action requests and communicating the action requests to the console 630. An action request received by the I/O interface 620 is communicated to the console 630, which performs an action corresponding to the action request.

The console 630 provides content to the eye-tracking validation system 610 for processing in accordance with information received from one or more of: the eye-tracking validation system 610 (e.g., feedback-based content), the I/O interface 620, and the movement server 650. In the example shown in FIG. 6, the console 630 includes an application store 632 and an engine 634. Some embodiments of the console 630 have different modules or components than those described in conjunction with FIG. 6. Similarly, the functions further described below may be distributed among components of the console 630 in a different manner than described in conjunction with FIG. 6. In some embodiments, the functionality discussed herein with respect to the console 630 may be implemented in the eye-tracking validation system 610, or a remote system.

The application store 632 stores one or more applications for execution by the console 630. An application is a group of instructions, that when executed by a processor, generates content for presentation to the user. Content generated by an application may be in response to inputs received at the I/O interface 620. Examples of applications may include generating movement sequences based on input parameter values that may be associated with various ocular disorders, standard eye-tracking calibration routines, etc.

The engine 634 executes applications and receives estimates of accuracy of the eye-tracking devices from the eye-tracking validation system 610. Based on the received information, the engine 634 determines further movement instructions to provide to the eye-tracking validation system 610. Additionally, the engine 634 may perform an action within an application executing on the console 630 in response to an action request received from the I/O interface 620 and provide feedback to the user that the action was performed. The provided feedback may be visual or audible feedback via the I/O interface 620.

The network 640 couples the eye-tracking validation system 610 and/or the console 630 to the movement server 650. The network 640 may include any combination of local area and/or wide area networks using both wireless and/or wired communication systems. For example, the network 640 may include the Internet, as well as mobile telephone networks. In one embodiment, the network 640 uses standard communications technologies and/or protocols. Hence, the network 640 may include links using technologies such as Ethernet, 802.11, worldwide interoperability for microwave access (WiMAX), 2G/3G/4G/5G mobile communications protocols, digital subscriber line (DSL), asynchronous transfer mode (ATM), InfiniBand, PCI Express Advanced Switching, etc. Similarly, the networking protocols used on the network 640 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), Point-to-Point (PPP) protocol, Wireless Application Protocol (WAP), etc. The data exchanged over the network 640 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The movement server 650 may store a model that establishes a mapping between visual and/or oculomotor/neurological/psychiatric disorders and eye movement data defined in association with values for eye-movement parameters. In some embodiments, eye-movement disorders may be defined by any combination of the following parameters: asymmetrical eye movements (e.g., either in direction for an individual eye, or between pairs of eyes), unstable (e.g., a lot of jitter in an individual eye position), slower (e.g., in initiation or mid-movement), incorrect amplitude (either too big or too small for a given viewing task), or in a wrong sequence or inappropriate to the task (e.g., a series of slow and fast movements that counteract each other). The model may be a machine learning model, a look-up table, etc. In some embodiments described herein, the movement server 650 may generate, update, maintain, or some combination thereof, the data associated with the model by an eye-movement system (not shown).

The eye-movement system may include a means to present visual content with controlled eye movement to a test user across a population of test users, where the test user wears a test device that is coupled to the head of the test user. The eye-movement system may include a means to receive information regarding eye movements of the test user in response to the presented visual content from eye-tracking cameras mounted on the test device. The eye-movement system may include a means to receive, concurrently with the information regarding eye movements of the test user, information regarding visual and/or psychiatric disorders as diagnosed in association with the test user. The eye-movement system may store the concurrently received information regarding the eye movements and the disorder related information for the population of test users.

In some embodiments, the information obtained from the population of test users may be used by the eye-movement system to train machine learning and/or deep learning models, such as regression models, reinforcement models, neural networks, encoder/decoder models such as auto-encoders, etc., to establish the correlation between eye-tracking movement parameter values and visual, neurological, and/or psychiatric disorders. In some embodiments, the machine learning model may be trained receiving information regarding a plurality of time series of one or more of: head movements and eye movements. The model may also receive information mapping each series of the plurality of time series of one or more of: head movements and eye movements to named visual conditions that may be normal vision or an identified visual disorder. The model may store the received information regarding the plurality of time series of one or more of: head movements and eye movements and the associated visual condition be trained based on the stored information regarding the time series of one or more of: head movements and eye movements and the associated visual condition, the training involving generating as output, a time series of eye movements in response to a named visual condition as input.

The eye-movement system may generate, update, and maintain the model on the movement server 650. In some embodiments, the model may be maintained as a function that maps disorders to specific eye-tracking movement parameter values such as eyeball rotational parameters, eyeball linear motion parameters, variance in gaze position and gaze direction for individual eyes, etc. In some embodiments, the model may be maintained as a look-up table that maps disorders to specific eye-tracking movement parameter values. The movement server 650 may include a database that stores the model. The movement server 650 may send the model to the eye-tracking validation system 610 through the network 640 upon receiving a request from the I/O interface 620. In some embodiments, the movement server 650 may periodically push an updated model or movement data to the eye-tracking validation system 610 for storage in the data store (e.g., the data store 450 in the eye-tracking validation system 400).

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   for each simulated eyeball of one or more simulated eyeballs of an oculomotor simulator:
   receiving instructions specifying movement for the simulated eyeball;
   enabling movement of the simulated eyeball based on the received instructions; and
   obtaining a ground-truth value for three-dimensional (3D) gaze of the simulated eyeball during the specified movement; and
   determining accuracy of an eye-tracking device, the determined accuracy based on received values for the 3D gaze of the simulated eyeballs from the eye-tracking device performing eye-tracking of the simulated eyeballs during the specified movement and the obtained ground-truth values for the simulated eyeballs.

2. The method of claim 1, wherein specifying the movement for the simulated eyeball comprises at least one of:
   specifying rotation parameters for the simulated eyeball; and
   specifying translational motion parameters for the simulated eyeball.

3. The method of claim 1, wherein obtaining the ground-truth value for the 3D gaze of the simulated eyeball during the specified movement comprises:
   receiving projection data from a laser diode that is located at the center of the simulated eyeball, the projection data based on 3D projection of the laser diode during the specified movement;
   determining 3D gaze direction for the simulated eyeball based on the received projection data; and
   establishing the determined 3D gaze direction for the simulated eyeball as the ground-truth value for the 3D gaze for the simulated eyeball during the specified movement.

4. The method of claim 3, wherein, prior to receiving the projection data from the laser diode, the method further comprises:
   causing the laser diode to project through an aperture at the center of a simulated pupil that is located on the simulated eyeball during the specified movement of the simulated eyeball.

5. The method of claim 3, wherein determining the accuracy of the eye-tracking device that is performing eye-tracking of the simulated eyeballs during the specified movements comprises:
   for each of the simulated eyeballs:
   receiving the 3D gaze direction for the simulated eyeball during the specified movement from the eye-tracking device;

comparing the obtained ground-truth value for the specified movement with the determined 3D gaze direction for the simulated eyeball from the eye-tracking device for the specified movement; and determining, based on the comparing, the accuracy of the eye-tracking device when tracking the simulated eyeball during the specified movement; and combining the determined accuracies of the eye-tracking device with respect to the selected simulated eyeballs to establish the accuracy of the eye-tracking device.

6. The method of claim 1, wherein prior to receiving instructions at the oculomotor simulator, the method comprises:

providing at least one named condition to a machine learning (ML) model, wherein the at least one named condition may be at least one of: normal vision or a named disorder;

receiving, from the ML model, a time-series of one or more of: head movements or eye movements corresponding to the at least one named condition; and generating instructions specifying movement for the one or more simulated eyeballs based on the received time-series of the one or more: head movements or eye movements corresponding to the at least one named condition.

7. The method of claim 6, wherein the ML model is previously generated, the generating comprising:

receiving training data comprising a plurality of time-series of one or more of: head movements or eye movements;

receiving training data associating each of the plurality of time-series of the one or more: head movements or eye movements to one or more named conditions, wherein the named conditions may be one or more of: normal vision or a named disorder;

storing the received training data regarding the plurality of time-series of the one or more: head movements or eye movements and the associated one or more conditions; and training the ML model based on the stored information regarding the time-series of the one or more: head movements or eye movements and the associated one or more conditions, the training involving generating as output, a time-series of one or more: head movements or eye movements in response to a named condition as input.

8. A device assembly comprising:

an oculomotor simulator assembly comprising:

one or more simulated eyeballs, wherein each of the one or more simulated eyeballs is coupled to a respective motor unit, and wherein for each of the simulated eyeballs:

the simulated eyeball is configured to perform movement as enabled by the coupled motor unit; and the simulated eyeball further comprises a laser diode located at a center of the simulated eyeball, the laser diode providing a 3D projection through a simulated pupil located on the simulated eyeball, the 3D projection normal to the simulated pupil;

a motor assembly comprising the one or more motor units, each motor unit coupled to one or more of the simulator eyeballs, the motor assembly configured to:

for each of the simulated eyeballs:

receive instructions from a control unit, the received instructions specifying movement for the simulated eyeball; and enable movement of the simulated eyeball through a coupled motor unit based on the received instructions from the control unit; and a control unit configured to:

receive instructions specifying movement for each of the simulated eyeballs from an I/O interface; and provide instructions to the motor assembly based on the received instructions from the I/O interface.

9. The device assembly of claim 8 further comprising:

an eye-tracking device assembly comprising at least one eye-tracking device, the eye-tracking device configured to, for each simulated eyeball, track the pupil of the simulated eyeball during the specified movement of the simulated eyeball, the eye-tracking device configured to provide 3D gaze direction for the simulated eyeball based on the tracked pupil of the simulated eyeball during the specified movement; and a validation system configured to:

for each of the simulated eyeballs, receive projection data based on the 3D projection from the laser diode at the center of the simulated eyeball;

determine the 3D gaze direction for the simulated eyeball based on the received projection data;

establish the determined 3D gaze direction for the simulated eyeball as the ground-truth value for the 3D gaze direction for the simulated eyeball during the specified movement;

receive the 3D gaze direction for the simulated eyeball from the eye-tracking device that is tracking the simulated eyeball; and determine the accuracy of the eye-tracking device when tracking the simulated eyeball during the specified movement based on the established ground-truth value for the 3D gaze direction and the received 3D gaze direction; and combine the determined accuracies of the eye-tracking device with respect to the simulated eyeballs to establish the accuracy of the eye-tracking device.

10. The device assembly of claim 8, wherein the oculomotor simulator assembly is mounted on a frame, wherein the frame is configured to enable movement of the one or more simulated eyeballs via the coupled one or more motor units.

11. The device assembly of claim 8, wherein the instructions specifying movement of the simulated eyeball comprise one or more of:

programmed input to the control unit via the I/O interface; and manual input to the control unit via the I/O interface.

12. The device assembly of claim 11, wherein the programmed input to the control unit is at least partially a replay of previously recorded real human eye movements.

13. The device assembly of claim 8, wherein the oculomotor assembly is mounted on a frame, wherein the frame is configured to be stationary relative to a platform.

14. The device assembly of claim 8, wherein the oculomotor assembly is mounted on a frame, wherein the frame is configured to be capable of movement relative to a platform.

15. The device assembly of claim 14, wherein the movement relative to the platform simulates human head movements.

16. The device assembly of claim 8, wherein a simulated eyeball of the one or more simulated eyeballs comprises one or more of:

selectable simulated eyeball structure parameters;

selectable simulated pupil parameters; and
selectable simulated iris parameters.

17. The device assembly of claim 8, further comprising one or more of:
    selectable inter-eyeball distance between two or more simulated eyeballs within the oculomotor assembly;
    selectable simulated eyeball locations within the oculomotor assembly; and
    selectable simulated eyeball alignments within the oculomotor assembly.

18. The device assembly of claim 8, further comprising selectable parameters for the one or more laser diodes located in the respective one or more simulated eyeballs.

19. A computer system comprising:
    a computer processor; and
    a non-transitory computer readable storage medium for storing instructions that when executed by a computer processor cause the computer processor to perform steps for determining accuracy of an eye-tracking device that is performing eye-tracking of the one or more simulated eyeballs, the steps comprising:
        for each simulated eyeball from a set of one or more simulated eyeballs of an oculomotor simulator:
            receiving instructions specifying movement for the simulated eyeball;
            enabling movement of the simulated eyeball based on the received instructions; and
            obtaining a ground-truth value for three-dimensional (3D) gaze of the simulated eyeball during the specified movement; and
        determining accuracy of an eye-tracking device, the determined accuracy based on received values for the 3D gaze of the simulated eyeballs from the eye-tracking device performing eye-tracking of the simulated eyeballs during the specified movement and the obtained ground-truth values for the simulated eyeballs.

20. The system of claim 19, wherein:
    obtaining the ground-truth values for the 3D gaze of the simulated eyeball during the specified movement comprises:
        receiving projection data from a laser diode that is located at the center of the simulated eyeball, the projection data based on 3D projection of the laser diode during the specified movement;
        determining 3D gaze direction for the simulated eyeball based on the received projection data; and
        establishing the determined 3D gaze direction for the simulated eyeball as the ground-truth value for the 3D gaze for the simulated eyeball during the specified movement; and
    determining the accuracy of the eye-tracking device that is performing eye-tracking of the simulated eyeball during the specified movement comprises:
        for each of the simulated eyeballs:
            receiving the 3D gaze direction for the simulated eyeball during the specified movement from the eye-tracking device;
            comparing the obtained ground-truth value for the specified movement with the determined 3D gaze direction for the simulated eyeball from the eye-tracking device for the specified movement; and
            determining, based on the comparing, the accuracy of the eye-tracking device when tracking the simulated eyeball during the specified movement; and
        combining the determined accuracies of the eye-tracking device with respect to the simulated eyeballs to establish the accuracy of the eye-tracking device.

* * * * *